United States Patent [19]

Greenlee

[11] Patent Number: 5,248,546
[45] Date of Patent: Sep. 28, 1993

[54] VINYL BASED ARTICLES IN CONTACT WITH CHLORO-FLUORO CHEMICALS

[75] Inventor: William S. Greenlee, Avon Lake, Ohio

[73] Assignee: The B. F. Goodrich Company, Brecksville, Ohio

[21] Appl. No.: 752,291

[22] Filed: Aug. 30, 1991

[51] Int. Cl.$^5$ .............................................. B32B 27/08
[52] U.S. Cl. ................................... 428/212; 428/339; 428/340; 428/414; 428/473.5; 428/484; 428/518; 428/519; 428/520
[58] Field of Search ............... 428/519, 518, 520, 340, 428/212, 339, 414, 484, 473.5; 525/80

[56] References Cited

U.S. PATENT DOCUMENTS 4,745,156  5/1988  Yoshihara et al. .................... 525/80

FOREIGN PATENT DOCUMENTS 2110157  4/1990  Japan .
2142845  5/1990  Japan .

*Primary Examiner*—P. C. Sluby
*Attorney, Agent, or Firm*—Miles B. Dearth

[57] ABSTRACT

This invention pertains to multilayer compositions, articles and processes for preparing and thermoforming said compositions and articles. Multilayer compositions exemplified comprise:

(A) a first layer of a polyvinyl chloride composition comprising the specified compounding ingredients and represented herein by preferred embodiments; and at least one other layer (B) comprising: a polyvinyl chloride composition together with specified and preferred compounding ingredients and including a heat distortion temperature improving additive, wherein the heat distortion temperature of the dominant phase, preferably a single phase, is at least three degrees celsius higher than said heat distortion temperature of said first layer.

Thermoformed articles of the invention are useful for example as inner-liners or door liner panels for referigerators where contact with HCFC chemicals, present in foam insulation, is necessary. Impact resistance is maximized, while chemical resistance and heat deflection temperature are maintained at performance levels acceptable in these applications.

22 Claims, No Drawings

VINYL BASED ARTICLES IN CONTACT WITH CHLORO-FLUORO CHEMICALS

FIELD OF THE INVENTION

This invention pertains to thermoplastic compositions which are chemically resistant to chlorofluoro carbon (CFC) compounds such as the recently developed hydrochlorofluorocarbons (CFC). Vinyl based articles coming in contact with HCFC compounds used as blowing agents are exemplified and exhibit good chemical resistance, barrier properties, heat deflection performance and thermoformability compared with conventional styrenic compositions used as components for example in thermoformed refrigerator inner liners.

BACKGROUND OF THE INVENTION

With the phase-out of certain environmentally damaging CFC compounds, new HCFC compounds have been offered. CFC numbers R11 ($CCl_3F$) and R12 ($CCl_2F_2$) are currently targeted for replacement. HCFC types designated R123 ($CHCl_2$—$CF_3$) and R141b ($CCl_2F$—$CH_3$) are currently being utilized as chemical blowing agents and have been shown to exhibit severe attack on certain conventional thermoplastic polymeric compositions rendering these useless in direct contact with R123 and R141b.

Polyvinyl chloride (PVC) would have chemical resistance to R123 and 141b, however many formulated PVC compounds show some detrimental effects, and lack several properties for successful commercial applications for instance in housings and components in direct contact with blown-in foams containing HCFC compounds. Typically, conventional PVC compositions have insufficient heat deflection temperature for some of these applications, and typically have unacceptable thermoforming properties such as a limited draw-ratio of original thickness to drawn thickness. More over, formulated PVC compounds having a heat distortion additive were observed to be deficient in chemical resistance due in part to higher required impact modifier levels which interfered with HCFC resistance. Because PVC has some inherent favorable properties, it would be desirable to provide PVC based compositions and thermoformed articles derived therefrom which exhibit a combination of properties rendering these useful in applications where direct contact with HCFC chemicals may be necessary.

SUMMARY OF THE INVENTION

It is one aspect of the present invention to provide improved polyvinyl chloride compounds having resistance to the effects of direct contact with HCFC compounds.

It is another aspect of the present invention to provide PVC compositions and shaped articles derived therefrom which exhibit good chemical resistance in contact with HCFC compounds.

It is yet another aspect of the present invention to provide novel multilayer compositions and articles comprising PVC in each layer, wherein the composite possesses improved thermoformability and heat deflection performance for use in componentry which may come in direct contact with HCFC compounds.

It is a further aspect of the present invention to provide multilayer extruded articles wherein each layer comprises a polyvinyl chloride compound and said layers possess similar melt viscosities for multi-layer extrusion; said layers also exhibit high inter-layer adhesion; and wherein the multilayer article exhibits high impact strength.

In yet another aspect of the present invention, a multilayer article comprising polyvinyl chloride is provided which can be preprocessed as regrind and incorporated into one of the compositions used to form the (A) or preferably the (B) layer. When reprocessed, the PVC compound may be mixed with virgin compound. The major phase of a reprocessed (B) layer will have a heat deflection temperature which is at least 3° C. higher than the major phase heat deflect temperature of the (A) layer.

In yet another aspect, this invention pertains to processes for preparing a multilayer sheet, and for thermoformed articles derived from said sheet.

It is a still further aspect of the present invention to provide improved multilayer articles each layer comprising polyvinyl chloride which exhibit good dimensional stability and flexural modulus under extended exposure to HCFC compounds, and wherein said multilayer articles comprise one layer which is preferably not objectionable for direct food contact. These and other aspects of the present invention are achieved by forming a multilayer article comprising:

(A) a first layer of a polyvinyl chloride composition comprising the specified compounding ingredients and represented herein by preferred embodiments wherein the heat distortion temperature of the dominant phase of the first layer is defined; and at least one other layer (B) comprising:
a polyvinyl chloride composition together with specified and preferred compounding ingredients including a heat deflection temperature improving additive, wherein the heat distortion temperature of the dominant phase, preferably a single phase, is at least three degrees celsius higher than said heat distortion temperature of said (A) layer.

There may be combined with said multilayer article a third layer (C) which comprises a polyvinyl chloride compound, contacting layer (A) or preferably layer (B). The arrangement of layers in one embodiment containing three layers is such that preferably layer (B) is between the other layers. In the embodiment comprising a two layer structure, layer (A) preferably provides an appearance layer when the article is contacted with an HCFC compound from the side opposite the appearance layer. For example, in a thermoformed refrigerator inner liner, the multilayer article is thermoformed into an open box shape, conforming to the dimensional requirements of the refrigerator. Blown foam insulation is introduced between the liner and the outer shell. HCFC will contact the inner liner. It has been found that certain formulated PVC multilayer compositions disclosed herein possess enough chemical resistance to withstand this contact without suffering unacceptable deterioration and/or distortion due to the heat buildup during the foaming process.

The general object of the present invention for the multilayer articles disclosed herein invention is to provide improvements in the following desired properties:

(A) Layer
1. high impact strength.
2. high initial gloss and retention of gloss after thermoforming, in the appearance layer.

|         | -continued |
|---------|------------|
|         | 3. acceptable direct food contact, for the appearance layer. |
|         | 4. excellent resistance to HCFC. |
|         | 5. good stability and processability. |
|         | 6. good thermoforming properties including deep draw capability. |
| (B) Layer | 1. melt viscosity for extrusion adjusted to that similar to (A). |
|         | 2. increased HDT above (A). |
|         | 3. good processability and stability. |
|         | 4. good HCFC resistance. |
|         | 5. colorability to match (A). |
|         | 6. excellent adhesion to (A). |
|         | 7. good thermoformability in combination with (A). |
|         | 8. adequate impact strength. |

DETAILED DESCRIPTION

Polyvinyl chloride polymers are well known and commercially available worldwide. Polyvinyl chloride polymers contemplated for use in the present invention include those prepared in a variety of ways. The particular method of preparation is beyond the scope of the present invention. Preferred methods are outlined below.

The PVC polymers can be prepared by polymerization methods including: mass, suspension, dispersion, and emulsion processes. A mass process is described in U.S. Pat. No. 3,522,227. A phase inversion process may also be used and is disclosed in U.S. Pat. No. 3,706,722. In the phase inversion process, the monomer is the continuous phase during the early part of the polymerization and after about 10% conversion additional water is added followed by phase inversion wherein water becomes the continuous phase and the monomer the discontinuous phase.

A skinless, suspension PVC (PVC5) resin is taught in U.S. Pat. No. 4,711,908. Reference is made to example 4 of U.S. Pat. No. 4,471,908 wherein low hydrolysis polyvinyl alcohol (PVA) and polyacrylic acid are used as vinyl chloride dispersants and wherein after commencement of polymerization, a base is introduced into the suspension thereby stripping off the polyacrylic acid dispersant layer from the particle surface. What remains is a porous particle achieved by the use of the porosifying effects of the low hydrolysis PVA, and substantially or completely devoid of a pericellular membrane.

The preparation of porous, skinless, crosslinked PVC (PVC6) resin is taught in U.S. Pat. No. 4,755,699. Reference is also made to example 1 of U.S. Pat. No. 4,775,699 where a skinless crosslinked PVC is shown which is similar to the skinless resin above in U.S. Pat. No. 4,471,908 except for the use of a copolymerizable crosslinking monomer e.g. diallyl phthalate.

Preferably, preparation of said PVC polymer is carried out in mass or by the aqueous suspension process. For the sake of brevity, an exemplary description for preparing the vinyl chloride polymers useful herein will pertain to the preparation of this component by the suspension method. It is understood that this description is not a limitation as to the specific polymer compositions nor the particular polymerizing technique for PVC which can be employed in preparing PVC used in this invention.

The suspension polymerization technique to prepare vinyl chloride polymers is well-known in the art and generally set forth in The Encyclopedia of PVC, pp. 76-85, Marcel Decker, Inc. (1976). Vinyl chloride polymer prepared by suspension polymerization employs an aqueous medium containing: (1) primary suspending agent(s) consisting of one or more polyvinyl alcohol polymers having a chosen degree of hydrolysis of generally 60-95%, cellulose ether, hydroxypropyl methylcellulose, partially hydrolyzed polyvinyl acetate, vinyl acetate-maleic anhydride, partially saponified polyalkyl acrylate or gelatin, and combinations of any of these; (2) optional secondary dispersing agents such as polyvinyl alcohol having a lower degree of hydrolysis of from about 20-60% (3) a monomer soluble polymerization initiator and (4) optional solvents such as THF.

Suitable polymerization initiators are selected from the conventional free radical initiators such as organic peroxides and azo compounds. The particular free radical initiator will depend upon the monomeric materials being copolymerized, the molecular weight and color requirements of the copolymer and the desired temperature of the polymerization reaction. A satisfactory amount of initiator is in the range of about 0.005 part by weight to about 1.00 part by weight, based on 100 parts by weight of monomer(s) being polymerized. Optional copolymerizable comonomers can be included for example, the esters of acrylic acid, for example, methyl acrylate, ethyl acrylate, butyl acrylate, octyl acrylate, cyanoethyl acrylate, and the like; vinyl esters such as vinyl acetate and vinyl propionate; esters of methacrylic acid, such as methyl methacrylate, ethyl methacrylate, hydroxyethyl acrylate, butyl methacrylate, and the like; nitriles, such as acrylonitrile and methacrylonitrile; acrylamides, such as methyl acrylamide, N-methylol acrylamide, N-butoxy methacrylamide, and the like; halogen containing vinyl monomers such as vinylidene chloride vinylidene fluoride, and vinyl bromide; vinyl ethers such as ethylvinyl ether, chloroethyl vinyl ether and the like; the vinyl ketones, styrene derivatives including α-methyl styrene, vinyl toluene, chlorostyrene; vinyl naphthalene; olefins such as ethylene, butene, isobutylene, propylene and hexene; and other copolymerizable monomers or mixtures of monomers having suitable reactivity ratios with vinyl chloride and known to those skilled in the art. Some embodiments of the present invention may employ PVC blends with crosslinked PVC or crosslinked PVC alone. Crosslinked PVC polymers can be made by polymerizing vinyl chloride in the presence of cross-linking monomers such as the aforementioned diallyl phthalate, trimethylol propane triacrylate, allyl methacrylate, and the like as taught in U.S. Pat. No. 4,755,699. Preferred comonomers are olefins. Particularly preferred are PVC copolymers with about 0.5 to about 5 phr isobutylene (PVC 3B).

After conversion of monomers, which said percent conversion is generally 50% or higher, the resin suspension is stripped of residual monomer, and dried to a free flowing powder. Suspension resins have generally average particle sizes ranging from about 50 to 250 microns. The preferred PVC polymer is a homopolymer or a copolymer with the preferred comonomer(s) in a minor amount of up to about 10 parts by weight. Particularly preferred are polyvinyl chloride resins substantially free of gel particles.

The inherent viscosity (I.V.) of polyvinyl chloride can be controlled by a variety of well understood methods such as control of polymerization temperature. The I.V. of polyvinyl chloride used in this invention can range from about 0.3 to about 4.0, with a preferred I.V. range of from about 0.5 to about 1.6. High I.V. PVC can also be incorporated as a minor component. Present at from about 1 to about 99 phr, preferably from 3 to about 50 phr. When used in this manner, it is preferred that the I.V. of the minor PVC component will be at least 0.2 I.V. units higher, more preferably at least about 0.35 units higher than the I.V. of the polyvinyl chloride used in a major amount.

The PVC compounds used herein typically contain other components including compounds selected from the group consisting of: lubricants, impact modifiers, tinting colorants, blueing agents, pigments, blowing agents, coupling agents, antioxidants, heat stabilizing ingredients, co-stabilizers, processing aids, and plasticizers.

Exemplary antioxidants include hindered alkylated phenolics as antioxidants include 2,6-di-t-butyl-4-methyl phenol also referred to as butylated hydroxy toluene, bis-phenols such as 2,2'-methylenebis(4-methyl-7-t-butylphenol), thio-phenols such as 4,4'-dihydroxydiphenyl sulfide, otherwise referred to as thiodiphenol, and di-phenyl ethers such as 4,4'-dihydroxydiphenyl ether, and mixtures thereof. These types of antioxidants when used are generally present in an amount from about 0.05 to 5 parts per hundred weight parts PVC in one layer (phr). Preferred antioxidants and heat stabilizers are those having acceptability under applicable FDA regulations.

Heat stabilizing ingredients employable in any layer herewith include alkyltin compounds such as dimethyl tin-bis isooctylthioglycolate (methyltin), di-butyltin-bis-isooctylthioglycolate (butyltin), octyltin, mixed metal alkyltins, dialkyl tin di-carboxylates, methyltin mercaptides, butyltin mercaptides, dialkyl tin bis(alkyl mercaptocarboxylate) including di-n-octyltin-S,S'-bis(isooctyl mercaptoacetate), and butylthiostannoic acid, and mixtures thereof. Any alkylated tin having features such as low toxicity e.g. higher alkyl types, FDA approval, USP class 6 approval, good color, clarity and compatibility, low plateout on equipment, and non-staining properties are desirable and preferred for use in this invention. Other useful stabilizers include metal or mixed metal soaps such as calcium/zinc soap stabilizers. Examples of suitable calcium soaps are calcium stearate, calcium laurate, calcium oleate, calcium palmitate, calcium octanoate, and calcium benzoate. Calcium stearate or combinations with stearic acid are preferred calcium soap stabilizer compositions. Examples of suitable zinc soaps are zinc stearate, zinc laurate, zinc palmitate, zinc 2-ethyl hexoate, zinc octanoate, zinc oleate, and zinc benzoate, and mixtures thereof. Zinc stearate is a preferred zinc soap. Lead or cadmium containing heat stabilizers are preferably absent in a layer having direct food contact. Metal soaps can be used at levels ranging from about 0.5 to 10 phr, preferably from about 1 to about 5 phr.

Co-stabilizers can be included with PVC in any layer, for example, phosphite stabilizers, polymeric phosphites, thioesters such as dilauryl thiodipropionate and beta-diketones. Plasticizing co-stabilizers known in the art can be optionally included for improved heat stability. Exemplary co-stabilizing plasticizers include epoxy derivatives such as epoxidized soybean oil and epoxidized linseed oil. Liquid stabilizing plasticizers are preferably absent or are present, at from 0.5 to about 10 phr, preferably from 1 to 5 phr.

At least one optional plasticizer may be included in any layer. Specific examples of plasticizers include derivatives of carboxylic acid esters including the various derivatives of adipic acid, azelaic acid, phthalic acid, benzoic acid, and citric acid, isobutyric acid, isophthalic acid derivatives, sebacic acid derivatives, isosebacic acid derivatives, stearic acid, tartaric acid, oleic acid, succinic acid; phosphoric acid derivatives; derivatives of terephthalates, pentaerythritol, trimellitic acid, and mixtures. Plasticizers, if present, are desiredly used at from 1 to 20 phr and preferably from 1 to about 10 phr. The articles of the present invention are preferably rigid therefore plasticizer levels are limited in any one layer. Other plasticizers can be included for example, partial esters of the above carboxylic acids, ethers, glycol derivatives, glycolates, glycerol derivatives. These are set forth in *The Technology of Plasticizers*, by Sears and Darby, pages 893-1085, John Wiley & Sons, New York, 1982. Preferred plasticizers are $C_{10}$ and higher alkyl diesters of phthalic acid, bisphthalates, $C_8$ and higher alkyl triesters of trimellitic acid, for example di-isodecyl phthalate (DiDP) and tri-octytrimellitate (TOTM).

In addition to the foregoing plasticizers, which are monomeric, various polymers can also be utilized such as the polyesters, halogenated polyolefins, oxidized polyolefins, polyepichlorohydrins, polyacrylates, ethylene copolymers, copolymers prepared from diolefins and, overpolymers of polar monomers overpolymerized onto flexible materials.

Polyester plasticizers are generally made from a dicarboxylic acid having from about 3 to about 12 carbon atoms and from a diol having from about 2 to about 1000 carbon atoms with propylene glycol being preferred. Examples of suitable polyesters include various esters made from adipic acid such as a polyester having a molecular weight of 6,000, e.g., Paraplex ® G-40, a polyester made from adipic acid having a molecular weight of about 2,200, Paraplex ® G-50, a polyester made from adipic acid having a molecular weight of about 3,300, Paraplex ® G-54, a polyester made from azelaic acid having a molecular weight of about 2,200, Plastolein ® 975, a polyester made from sebacic acid such a Paraplex ® G-25, a polyester made from glutaric acid, a polycaprolactone polyester, and the like. Paraplex is a trademark of C.P. Hall Co. and Plastolein is a trademark of Emery Industries, Inc.

Other components in said PVC containing layers may include fillers, pigments, antistatic agents, anti-fogging agents, colorants and processing aids all of which are commercially available and listed in *Modern Plastics Encyclopedia* 1988 published by McGraw Hill Co.

At least one impact modifier is necessary in at least one layer. Optionally at least one impact modifier is present in more than one layer. In the preferred embodiment minimum amounts of impact modifier are used. Preferred levels are less than 20 phr in the layer having the highest HCFC resistance. More preferred levels of impact modifier are from 0 to 15 phr, still more preferred are levels from 0 to 10 and most preferred are levels ranging from 0 to 5 phr in the layer having the higher HCFC resistance. These include acrylonitrile butadiene styrene terpolymers (ABS) and methacrylate butadiene styrene (MBS). Other impact modifiers are disclosed in *Plastics compounding*, November/December, 1983: "Update: Impact Modifiers for Rigid PVC," by Mary C. McMurrer. Impact modifiers generally contain a rubbery core component. Various embodiments are commercially available and include polybutadienes jointly graft-copolymerized with styrene and methyl methacrylate (MBS). Paraloid ® KM-653 (M24), BTA-733 (M25) from Rohm and Haas, or Kanegafuchi B-56 and B-22KO MBS types; polybutadienes jointly graft-copolymerized with acrylonitrile and styrene (ABS), low rubber types are preferred; nitrile rubber blended with SAN; polybutadienes jointly graft-copolymerized with acrylonitrile and alpha-methyl styrene; ethylene-propylene-diene rubber, referred herein as EPDM graft-copolymerized with vinyl chloride, EPDMs jointly graft-copolymerized with styrene and acrylonitrile, polybutadienes graft-copolymerized with styrene, methyl methacrylate and acrylonitrile (MABS); polyacrylates such as those believed to be polybutyl acrylate graft-copolymerized with methyl methacrylate, (KM ®-323B, KM ®-330 Trademark of Rohm and Haas); polybutyl acrylate jointly graft-copolymerized with methyl methacrylate and styrene, polybutyl acrylate graft polymerized with acrylonitrile and styrene (Blendex ® 975,977, or 979-Trademark of General Electric); butyl rubbers graft-copolymerized with vinyl chloride, block copolymers of styrene-butadiene-styrene, radial block copolymers of styrene and butadiene, styrene-butadiene rubbers, vulcanizable acrylate rubbers, EPDMs and the like. Various preferred impact modifiers are commercially available and specified hereinbelow. Chlorinated polyethylene (CPE) is an exemplary impact modifier. Percent chlorine content preferably ranges from about 25% to 40%. CPE containing 25% (CPE25) and 36% (CPE36) are commercially available from Dow Chemical Inc.

Exemplary antistats are commercially available under the Glycolube ® trademark of Lonza Corp. An exemplary antifogging agent includes the alkyl phenol ethoxylates as for example those commercially available under the Surfonic trademark of Texaco, Inc.

Exemplary lubricants are the various hydrocarbons, such as paraffins, paraffin oils, low molecular weight polyethylene, oxidized polyethylene, fatty acids such as stearic acid, fatty alcohols such as cetyl, stearyl, or octadecyl alcohol; the aforementioned metal soaps such as calcium or zinc salts of stearic acid; amides of organic acids such as stearamide, ethylene-bis-stearamide; esters and partial esters such as butyl stearate, glycerol monostearate, hexaglycerol distearate; and ester waxes such as stearyl esters. Combinations of mineral oil, stearic acid derivatives and waxes at from 2 to 5 phr total are a suggested example of lubricant combinations. In one preferred example of a lubricant package, mineral oil, stearic acid, metal salt of stearic acid, paraffin wax are combined and used at from 3 to 5 phr total. A combination of hydroxy stearic acid, oxidized polyethylene, ester wax and acrylic processing aid is a desirable lube package (L1). A lubricant combination of mineral oil and calcium stearate (L2), of hydroxy stearic acid, oxidized polyethylene and LOXIOL ® G-705 Trademark of Ionza (L3), or a combination of mineral oil and stearic acid (L4) may be advantageously used; a combination of ester wax, oxidized polyethylene and stearic acid (L5) is suggested; and a combination of stearic acid, calcium stearate, and mineral oil (L6) is suggested. The externally acting lubricants listed among those above are less polar, and typically have longer alkyl chains such as paraffins, stearates, and bis-stearamides. However, combinations of internal and external lubricants may also be used. Lubrication of the PVC compound of the present invention is a complex art. Since many lubricants can be combined in countless variations, the total amount of lubricant may vary generally from about 2 to 10 phr, preferably from 3 to about 6 phr total in any layer. A variety of combinations were found to give good results with different I.V. PVC. Generally, a lesser total amount of lubricants was required when lubricating a PVC having an I.V. less than about 0.6. Whereas, when lubricating a PVC of I.V. 0.8 or higher, relatively more lubricating ingredients were needed. Several combinations are suggested herein within practical ranges. Optimization of particular individual formulations is beyond the scope of the present invention, and can be achieved by one skilled in the art with routine trial and error.

Exemplary processing aids are acrylic polymers such as poly methyl acrylate based materials. Adjustment of melt viscosity can be achieved as well as increasing melt strength by employing commercial acrylic process aids such as those from Rohm and Haas under the Paraloid ® Trademark. Paraloid ® K-120ND, K-120N, K-175, and other processing aids are disclosed in *The Plastics and Rubber Institute; International Conference on PVC Processing*, Apr. 26–28 (1983), Paper No. 17. One useful processing aid is a copolymer of styrene and acrylonitrile, such as 75:25 styrene: acrylonitrile copolymer (M13) made by batch emulsion polymerization.

Exemplary fillers are optional and include clay, barytes, calcium carbonate and talc. Preferred opacifying pigments when used are the various titanium dioxides ($TiO_2$) which are commercially available. Useful $TiO_2$ types are uncoated, rutile titanium dioxide powder exhibiting high chalking, such as Ti-Pure ® R-100 from E.I. DuPont De Nemours and Co. Inc. (DuPont).

Exemplary heat distortion improving agents include styrene-acrylonitrile copolymer, alpha methyl styrene-styrene-acrylonitrile terpolymer, a polymer of alpha methyl styrene-styrene-N-cyclohexyl maleimide, N-phenylmaleimide, imidized polymethyl methacrylate, post-chlorinated polyvinyl chloride, styrenemaleic anhydride polymer, imidized styrene-maleic anhydride polymer, acrylicimide copolymer, acrylonitrile-acrylate copolymer, acrylonitrile-acrylatepolybutadiene graft copolymer, alpha methyl styrene-methylmethacrylateacrylonitrile terpolymer, polycarbonate, and brominated polycarbonate (M26).

| | | Polyvinyl Chloride Resin Types | |
|---|---|---|---|
| Type | I.V. | Type | Notes |
| 1 | 0.54 | Suspension | Geon ® 110 × 377 |
| 2 | 0.68 | Mass | Geon ® 86 × 1 |
| 3A | 0.65 | Suspension | |
| 3B | 0.65 | Suspension | Isobutylene Copolymer |
| 4 | 0.92 | Suspension | Geon ® 103EP-F76 |
| 5 | 1.6 | Suspension | Skinless |
| 6 | NA | Crosslinked PVC | Skinless |
| 7 | 0.46* | CPVC (63.5% Cl) | *of PVC precursor |
| 8 | 0.46* | CPVC (68.5% Cl) | *of PVC precursor |

The above listed polymers are exemplary of polyvinyl chloride and/or post-chlorinated polyvinyl chloride polymers preferably contained in each layer of the present invention. These polymers were formulated with stabilizer, impact modifier(s), processing aid(s), filler, pigment, lubricants and in some instances colorants. Below are listed some compounding additives used in the samples.

| MODIFIER | | |
|---|---|---|
| Mod. Type No. | Believed Composition Type | Commercial Designation |
| M1 | ABS | Blendex ® 310[1] |
| M2 | ABS | Blendex ® 338 |
| M3 | ABS | Blendex ® 467 |
| M4 | ASA | Blendex ® 975 |
| M5 | ASA | Blendex ® 977 |
| M6 | ASA | Blendex ® 979 |
| M7 | α-MS/SAN/ABS | Blendex ® 703 |
| M8 | MMA/S/AN | Blendex ® 590 |
| M9 | MBS | Kane-Ace ® B-56[2] |
| M10 | MBS | Kane-Ace ® B-22KO |
| M11 | Acrylic | Paraloid ® KM 330[3] |
| M12 | Acrylic | Durastrength ® 200[4] |
| M13 | SAN | Processing Aid |
| M14 | SMA | Dylark 378 ®[5] |
| M15 | α-MS/SAN | Blendex ® 586 |
| M16 | DOP | Di-2-ethylhexyl phthalate |
| M17 | ESO | Epoxidized soy oil |
| M18 | glycerol monostearate | Glycolube 825[6] |
| M19 | EVA/CO | Elvaloy 741 ®[7] |
| M20 | Acrylic Imide | Paraloid ® HT-510[3] |
| M21 | Acrylic | Paraloid ® K-120N[3] |
| M22 | SAN | SAN ® 125[8] |
| M23 | Nitrile | Chemigum ® P-83[9] |
| M24 | MBS | Paraloid ® KM-653[3] |

[1]Trademark of G.E. Spec. Chemicals;
[2]Trademark of Kanegafuchi;
[3]Trademark of Rohm & Haas;
[4]Trademark of Atochem;
[5]Trademark of Arco
[6]Trademark of Glyco
[7]Trademark of DuPont
[8]Trademark of Dow Chemical
[9]Trademark of Goodyear

Compounding Additives

The samples each comprise PVC resin or blends of PVC resins along with any of the packages listed below:

| | (Wt.) Amount PHR | | (PHR) |
|---|---|---|---|
| Standard Package A | | Standard Package B | |
| Alkyl tin stab. | 2 | Methyltin | 3 |
| M13 | 3 | M21 | 1.5 |
| CaCO3 | 5 | M16 | 2 |
| TiO2 | 2 | M17 | 4.5 |
| L2 | 4.2 | M18 | 1 |
| M2 | 12 | CaCO3 | 12 |
| | | L1 | 2.6 |
| Standard Package C | | Standard Package D | |
| Methyltin | 2 | Methyltin | 3 |
| CaCO3 | 5 | CaCO3 | 12 |
| M13 | 3 | M21 | 1.5 |
| TiO2 | 10 | M16 | 2 |
| L2 | 4 | M17 | 4.5 |
| M1 | 15 | TiO2 | 3.5 |
| | | M18 | 1 |
| | | L1 | 2.6 |
| | | Paraloid ® K175 | 1.0 |
| Standard Package E | | Standard Package F | |
| M21 | 2 | M21 | 2 |
| methyltin | 2 | methyltin | 2 |
| M17 | 3 | M17 | 1 |
| TiO2 | 4.5 | TiO2 | 4.5 |
| Calcium Stearate | 1.5 | Calcium Stearate | 1.5 |
| M18 | 1.0 | M18 | 1.0 |
| Standard Package G | | | |
| M12 | 2 | | |
| M11 | 6 | | |

| | (Wt.) Amount PHR | (PHR) |
|---|---|---|
| L4 | 2.3 | |

**Trademark of Witco Inc.

| | Series A |
|---|---|
| Sample | Composition |
| A1 | Control 1 |
| A2 | Control 2 |
| A3 | Control 3 |
| A4 | Control 4 |
| A5 | Control 5 |
| A6 | 100 parts PVC 3A/std. pkg. A/12 phr M2 |
| A7 | 100 parts PVC 1/std. pkg. A/12 phr M2 |
| A8 | 100 parts PVC 2/std. pkg. A/12 phr M2 |
| A9 | 100 parts PVC 4/std. pkg. A/12 phr M2 |
| A11 | 100 parts PVC 3B/std. pkg. A/12 phr M2 |
| A15 | 100 parts PVC 4/std. pkg. A |
| A16 | 100 parts PVC 2/10 phr CPE/std. Pkg. A |
| A17 | 100 parts PVC 2/1 phr ester wax/0.5 phr oxidized polyethylene(PE)/2 phr TiO2/1 phr Paraloid ® K175/2 phr methyltin/2 phr calcium stearate/0.1 phr stearic acid/0.1 phr paraffin wax |
| A18 | 100 parts PVC 2/50 phr CPE/std. pkg. A |
| A19 | 100 parts PVC 2/30 phr DiDP/std. pkg. A |
| A20 | 100 parts PVC 4/30 phr CPE/std. pkg. A |
| A21 | 100 parts PVC 4/30 phr DiDP/std. pkg. A |
| A22 | 100 parts PVC 4/70 phr TOTM/std. pkg. A |
| A23 | 100 parts PVC 4/70 phr DiDP/std. pkg. A |
| A24 | 100 parts PVC 4/30 phr polyurethane**/std. pkg. A |
| A25 | 100 parts PVC 4/10 phr DiDP/std. pkg. A/L4/2 phr stearic acid |
| A26 | 100 parts PVC 4/30 phr ToTM/2 phr methyltin/3 phr M13/2 phr TiO2/5 phr CaCO3/L2/0.1 phr stearic acid/0.1 phr paraffin wax. |
| A27 | 100 parts PVC 1/2 phr methyltin/5 phr CaCO3/3 phr M13/10 phr TiO2/L2/15 phr M1 |
| A28 | 100 parts PVC 2/std. pkg. B |
| A29 | 100 phr CPVC/std. pkg. B/No CaCO3 |
| A30 | 100 phr CPVC 7/std. pkg. B/5 phr CaCO3 |
| A31 | 100 phr CPVC 8/std. pkg. B/No CaCO3 |
| A32 | 100 phr CPVC 8/std. pkg. B/2 phr DOP/1 phr M18/0.3 phr oxidized polyethylene/0.5 phr ester wax/1.0 phr K175 |
| A33 | 100 parts PVC 2/std. pkg. B/5 phr MgO/50 phr M19 |
| A34 | 100 parts PVC 2/std. pkg. B/5 phr MgO/50 phr M19 |
| A35 | 50 parts PVC 2/std. pkg. B/50 phr M23 |
| A36 | 100 parts PVC 2/std. pkg. B/50 phr M13 |
| A37 | 50 parts PVC 2/std. pkg. B/50 phr M13 |
| A38 | 90 parts PVC 1/10 parts PVC 4/std. pkg. C |
| A39 | 70 parts PVC 1/30 parts PVC 4/std. pkg. C |
| A40 | 50 parts PVC 1/50 parts PVC 4/std. pkg. C |
| A41 | 100 parts PVC 2/std. pkg. D/50 phr M11 |
| A42 | 50 parts PVC 2/std. pkg. D/50 phr M11 |
| A43 | 50 parts PVC 2/std. pkg. D/50 phr M12 |
| A44 | 100 parts PVC 2/std. pkg. D/50 phr M12 |
| A45 | 100 parts PVC 2/std. pkg. D/12 phr M2/45 phr CaCO3 |
| A46 | 50 parts PVC 2/std. pkg. D/50 phr CaCO3 |
| A47 | 100 parts PVC 2/3 phr butyltin/std. pkg. D/12 phr M2 |
| A48 | 100 parts PVC 1/2 phr methyltin/5 phr CaCO3/3 phr M13/10 phr TiO2/2 phr mineral oil/2 phr calcium stearate/15 phr M1 |
| A49 | 100 parts PVC 2/std. pkg. B/L1/12 phr CaCO3/12 phr M2/3.5 phr TiO2 |
| A50 | 100 parts PVC 2/std. pkg. B without M16/L1/12 phr M2/12 phr CaCO3/3.5 phr TiO2 |
| A51 | 100 parts PVC 2/std. pkg. B without M16 and M17/12 phr M2 12 phr CaCO3/3.5 phr TiO2/L1 |
| A52 | 100 parts PVC 2/std. pkg. B without M16/L1/12 phr CaCo3/3.5 phr TiO2 |
| A53 | 100 parts PVC 2/std. pkg. B without M16 and M17/3.5 phr TiO2/L1 |
| A54 | 100 parts PVC 2/std. pkg. B without M16 and M17 |
| A55 | 100 parts PVC 2/std. pkg. B/5 phr CaCO3/12 phr M1/L1 |
| A56 | 100 parts PVC 2/std. pkg. B/5 phr CaCO3/12 phr M4/L1 |
| A57 | 100 parts PVC 2/std. pkg. B/5 phr CaCO3/12 phr M6/L1 |
| A58 | 100 parts PVC 2/std. pkg. B/5 phr CaCO3/12 phr M5/L1 |
| A59 | 100 parts PVC 2/std. pkg. B/12 phr M2/5 phr CaCO3/12 |

-continued

Series A

| Sample | Composition |
|---|---|
| | phr M8/L1 |
| A60 | 100 parts PVC 2/std. pkg. B/5 phr CaCO3/12 phr M3/L1 |
| A61 | 100 parts PVC 2/std. pkg. B/5 phr CaCO3/12 phr M7/L1 |
| A62 | 100 parts PVC 2/std. pkg. B/5 phr CaCO3/12 phr CPE 36/L1 |
| A63 | 100 parts PVC 2/std. pkg. B/5 phr CaCO3/12 phr M11/L1 |
| A64 | 100 parts PVC 2/std. pkg. B/5 phr CaCO3/5 phr CaCO3/12 phr M9/L1 |
| A65 | 100 parts PVC 2/std. pkg. B/5 phr CaCO3/12 phr M2/L1 |
| A66 | 100 parts PVC 2/std. pkg. B/5 phr CaCO3/12 phr M10/L1 |
| A67 | 100 parts PVC 2/std. pkg. B/5 phr CaCO3/12 phr M12/L1 |
| A68 | 80 parts PVC 2/20 parts PVC 6/std. pkg. B/12 phr M2/L1 |
| A69 | 70 parts PVC 2/30 parts PVC 6/std. pkg. B/12 phr M2/10 phr M18/5 phr CaCO3/L1 |
| A70 | 80 parts PVC 2/20 parts PVC 5/std. pkg. B/12 phr M2/5 phr CaCO3/L1 |
| A71 | 70 parts PVC 2/30 parts PVC 5/std. pkg. B/12 phr M2/5 phr CaCO3/L1 |
| A72 | 70 parts PVC 2/30 parts PVC 4/std. pkg. B/12 phr M2/5 phr CaCO3/L1 |
| A73 | 70 parts PVC 2/std. pkg. B/30 phr M2/5 phr CaCO3/L1 |
| A74 | 70 parts PVC 2/std. pkg. B/5 phr CaCO3/30 phr M4/L1 |
| A75 | 70 parts PVC 2/std. pkg. B/5 phr CaCO3/30 phr M6/L1 |
| A76 | 70 parts PVC 2/std. pkg. B/5 phr CaCO3/30 phr M5/L1 |
| A77 | 70 parts PVC 2/std. pkg. B/5 phr CaCO3/30 phr M8/L1 |
| A78 | 70 parts PVC 2/std. pkg. B/5 phr CaCO3/30 phr M3/L1 |
| A79 | 70 parts PVC 2/std. pkg. B/5 phr CaCO3/30 phr M7/L1 |
| A80 | 70 parts PVC 2/std. pkg. B/5 phr CaCO3/30 phr CPE 36/L1 |
| A81 | 70 parts PVC 2/std. pkg. B/5 phr CaCO3/30 phr M11/L1 |
| A82 | 70 parts PVC 2/std. pkg. B/5 phr CaCO3/30 phr M9/L1 |
| A83 | 70 parts PVC 2/std. pkg. B/5 phr CaCO3/30 phr M12/L1 |
| A84 | 70 parts PVC 2/std. pkg. B/5 phr CaCO3/30 phr M10/L1 |
| A85 | 70 parts PVC 2/std. pkg. B/5 phr CaCO3/30 phr M1/L1 |
| A86 | 100 parts PVC 2/std. pkg. B/5 phr CaCO3/12 phr M2/3.5 phr TiO2/L1 |
| A87 | 80 parts PVC 2/std. pkg. B/3.5 phr M21/3.5 phr TiO2 12 phr M2/12 phr CaCO3/20 phr M26/L1 |
| A88 | 70 parts PVC 2/std. pkg. B/3.5 phr M21/3.5 phr TiO2 12 phr M2/12 phr CaCO3/30 phr M26/L1 |
| A89 | 50 parts PVC 2/std. pkg. B/62 phr M2/12 phr CaCO3/L1 |
| A90 | 100 parts PVC 2/std. pkg. B/12 phr M2/12 phr CaCO3/L1 |
| A91 | 100 parts PVC 4/1.5 phr methyltin/2 phr calcium stearate/7.5 phr TiO2/2 phr amide wax/3 phr M13/5 phr Blendex ® 336/10 phr CaCO3 |
| A92 | 100 parts PVC 4/std. pkg. F/std. pkg. G |
| A93 | 100 parts PVC 2/1.5 parts methyltin/2 phr calcium stearate/7.5 phr TiO2/2 phr ethylene bis stearamide/3 phr M13/5 phr Blendex ® 336/10 phr CaCO3 |
| A94 | 100 parts PVC 2/std. pkg. F/std. pkg. G |
| A95 | 100 parts PVC 2/std. pkg. F/std. pkg. G/8 phr M1 |
| A96 | 100 parts PVC 2/std. pkg. F/std. pkg. G/8 phr M2 |
| A97 | 100 parts PVC 2/std. pkg. F/std. pkg. G/8 phr M6 |
| A98 | 100 parts PVC 2/std. pkg. F/std. pkg. G/8 phr M3 |
| A99 | 100 parts PVC 2/std. pkg. F/std. pkg. G/8 phr M25 |
| A100 | 100 parts PVC 2/std. pkg. F/std. pkg. G/8 phr M10 |
| A101 | 100 parts PVC 2/std. pkg. F/std. pkg. G/8 phr M25 |
| A102 | 100 parts PVC 2/std. pkg. F/1.5 phr mineral oil/0.8 phr stearic acid/16 phr M24 |
| A103 | 100 parts PVC 2/std. pkg. F/L4/16 phr M1 |
| A104 | 100 parts PVC 2/std. pkg. F/L4/16 phr M6 |
| A105 | 100 parts PVC 2/std. pkg. F/16 phr M11 |

**ex BFGoodrich Co.

PERFORMANCE RATING TESTS

The desired properties for using the PVC containing multilayer articles are:
1. HCFC Barrier properties
2. gloss
3. thermoforming performance
4. low incidence of gels
5. HCFC chemical resistance

HCFC BARRIER TEST

PVC compounds were mixed in a Henschel-type mixer, milled on a heated 2-roll mill with a roll temperature of approx. 368° F. (186° C.) and stock temperature of approx. 385° F. (196° C.). The fluxed compounds were extruded and cubed. The cubes were introduced into a ¾ inch Brabender ® extruder having an L/D of 20:1, and extruded through a 4 inch sheet die (10 cm). Extruder barrel zone temperatures were: 155° C., 170° C., and 185° C. with the temperature of the die at 190° C. The extruded strips were compression molded to 20 mills (0.05 cm.) thickness. Circular discs were punched out from these strips. A PVC disc was placed together with a 40–50 mil (0.2 cm) disc prepared from a conventional ABS compound used for refrigerator inner liners. A polyethylene o-ring type gasket was used.

The discs were sealed by a closure on top of 8 oz. jars containing the particular HCFC evaluated. The samples thus had the PVC layer directly exposed to HCFC vapors for 7 days exposure at ambient temperature.

Catastrophic failure is noted when the molded ABS compositions crack severely, or the surfaces exhibit small cracks or crazing throughout. These ABS compositions if contacted with HCFC are normally destroyed or severely damaged. To the extent that exposure of the ABS discs, separated from HCFC by the PVC disc, did not undergo degradation, this served as an indication of the barrier performance of the layer. For testing purposes single-layer compositions comprising PVC were shown. to exhibit a range of chemical resistance to HCFC. Chemical resistance ratings were made by observing the appearance of the ABS discs following exposure to HCFC:

| Criteria (ABS) | Rating |
|---|---|
| Pits and blisters (large) | 1 |
| Bonding of PVC to ABS | 1–2 |
| Partial bonding to ABS | 3–4 |
| Some surface damage to ABS | |
| Small Pits | 7–8 |
| Small crazes | 9 |
| Stains/few small blisters | 9 |
| ABS unaffected | 10 |

Those samples rating high are more preferred, in terms of chemical resistance. One may select those compositions for use in preparing the (A) layer of this invention on the basis of the barrier performance listed in Tables 2A, 2B and 2C.

TABLE 2A

HCFC BARRIER RATING - A SERIES

| Sample # | Pass - Fail | |
|---|---|---|
| | 123 | 141b |
| A1 | 10 | 10 |
| A2 | 10 | 7 |
| A3 | 2 | 2 |
| A4 | 10 | 6 |
| A5 | 10 | 6 |
| A6 | 8 | 10 |
| A7 | 10 | 10 |
| A8 | 10 | 10 |
| A9 | 9.5 | 10 |
| — | — | — |
| A11 | 10 | 7 |
| — | — | — |
| — | — | — |

TABLE 2A-continued
HCFC BARRIER RATING - A SERIES

| Sample # | Pass - Fail | |
|---|---|---|
| | 123 | 141b |
| A16 | 8 | 10 |
| A17 | 8 | 10 |
| A18 | 4 | 2 |
| A19 | 2 | 2 |
| A20 | 5 | 5 |
| A21 | 2 | 2 |
| A22 | 1 | 2 |
| A23 | 1 | 2 |
| A24 | 3 | 8 |
| A25 | 5 | 8 |
| A26 | 9 | 10 |
| A27 | 10 | 10 |
| A28 | 9 | 8.5 |
| A29 | 9.5 | 8.5 |
| A30 | 13 | 6 |
| A31 | 10 | 9.8 |
| A32 | 10 | 5 |
| A33 | 1 | 4 |
| A34 | 1 | 3 |
| A35 | 1 | 4 |
| A36 | 1 | 6 |
| A37 | 5 | 4 |
| A38 | 1 | 10 |
| A39 | 10 | 10 |
| A40 | 10 | 10 |
| A41 | 1 | 7 |
| A42 | 1 | 1 |
| A43 | 1 | 4 |
| A44 | 1 | 6 |
| A45 | 3 | 8.5 |
| A46 | 1 | 3 |
| A47 | 8.5 | 8.5 |

TABLE 2B
HCFC BARRIER RATING - A SERIES

| Sample # | Pass - Fail | |
|---|---|---|
| | 123 | 141b |
| A48 | 9.8 | 10 |
| A49 | 1 | 9.2 |
| A50 | 9.8 | 9.3 |
| A51 | 10 | 10 |
| A52 | 9.7 | 10 |
| A53 | 10 | 9.8 |
| A54 | 10 | 10 |
| A55 | 9.7 | 8.8 |
| A56 | 8.9 | 8.7 |
| A57 | 9 | 9.2 |
| A58 | 9.5 | 9.7 |
| A59 | 8.7 | 9 |
| A60 | 8.7 | 9 |
| A61 | 9.4 | 10 |
| A62 | 9.2 | 9 |
| A63 | 8.8 | 9.8 |
| A64 | 9.3 | 8.7 |
| A65 | 10 | 8.6 |
| A66 | 9.7 | 8.8 |
| A67 | 9.2 | 8.3 |
| A68 | 9.6 | 8.5 |
| A69 | 8.5 | 8.5 |
| A70 | 9.5 | 9.2 |
| A71 | 9.3 | 8.7 |
| A72 | 9.8 | 9.2 |
| A73 | 1 | 7 |
| A74 | 1 | 6 |
| A75 | 1 | 5 |
| A76 | 1 | 6 |
| A77 | 1 | 1 |
| A78 | 1 | 5 |
| A79 | 1 | 8.7 |
| A80 | 3 | 6 |
| A81 | 7 | 7 |
| A82 | 1 | 1 |
| A83 | 1 | 1 |
| A84 | F | 7 |

TABLE 2B-continued
HCFC BARRIER RATING - A SERIES

| Sample # | Pass - Fail | |
|---|---|---|
| | 123 | 141b |
| A85 | 1 | 7.5 |
| A86 | 8.5 | 8.5 |
| A87 | 8.8 | 9.3 |
| A88 | 7.5 | 8.5 |
| A89 | 1 | 2 |
| A90 | 9.2 | 9 |

TABLE 2C
HCFC BARRIER RATING - A SERIES

| Sample # | Pass - Fail | |
|---|---|---|
| | 123 | 141b |
| A91 | P | P |
| A92 | F | P |
| A93 | P | P |
| A94 | P | P |
| A95 | P | P |
| A96 | P | P |
| A97 | P | P |
| A98 | P | F |
| A99 | F | F |
| A100 | P | P |
| A101 | P | P |
| A102 | F | P |
| A103 | F | F |
| A104 | P | P |
| A105 | P | P |

From the HCFC barrier data of tables 2A, B and C it can be seen that PVC having an I.V. of 0.54 (A7, A38, A39, A40); as well as PVC having I.V. of 0.68 (A8, A50–54 etc.); CPVC (A31); and PVC blends of different I.V. (A38–A40, A70, A72) can be formulated to give good HCFC barriers as tested. It has been found that various compounding ingredients, when present, interfere with HCFC barrier performance. Therefore these are preferably absent or present at minimal levels in the compounds used to derive articles having contact with HCFC. Liquid plasticizers such as epoxidized soy oil and di-2-ethylhexyl phthalate are detrimental (A38–40, A50–54 versus A28A30).

Higher molecular weight plasticizers DIDP, and TOTM for example, did not interfere significantly, therefore when optional plasticizers are used, those having a molecular weight equal or greater than di-2-ethylhexyl phthalate (390) are preferred. Such exemplary phthalates and bisphthalates are n-octyl n-decyl phalate, di-isodecyl phthalate, heptyl nonyl undecyl, di-undecyl phthalate, di-tridecyl phthalate, ethylene glycol bis(n-butyl phthalate) and 7-(2,6,6,8 tetramethyl-4-oxa-3oxo-nonyl) phthalate. Trimellitates can be used, such as alkyl-aryl trimellitate, tri-2-ethylhexyltrimellitate (TOTM) and heptyl nonyl trimellitate.

The preferred PVC compounds in the A-layer are those exhibiting adequate barrier properties in at least one HCFC, and most preferably more than one HCFC. Polyvinyl chloride compounds preferably contain: PVC having an I.V. of between about 0.3 and 2.0, preferably from about 0.5 to 1.6 and most preferably from about 0.6 to 1.0. Preferred components include methacrylate-butadiene-styrene polymers; optional chlorinated polyethylene; preferred are acrylic impact modifiers; stabilizer for PVC; lubricants preferably external types; optional plasticizers of preferred molecular weight; optional acrylonitrile-styrene-acrylic (ASA) polymeric modifiers; optional styreneacrylonitrile copolymers (SAN); optional polymeric plasticizers such as: polyesters and polyethers; other plasticizers such as sulfonamides, glycol esters, glycerol esters, chlorinated paraffins; citrates, sebacates, benzoates, phosphates, and adipates.

Thermoformability

The compositions used to form multilayer layer articles were evaluated for thermoforming performance. A detailed review of sheet thermoforming of PVC compounds is provided in *PVC Technology* by W. V. Titow, 4th.ed., Elsevier Applied Science, at chapter 16, pp. 743-763. Thermoformable composite sheets of ABS in one layer and PVC in the other layer are known and discussed in Plastics Rubber Weekly, Nov. 23, 1979, pp. 17-26. Any thermoforming method may be used among various methods known in the art of sheet thermoforming, or the thermoforming of cast, or extruded melts. For the sake of brevity thermoforming of prepared sheets will be described by the straight thermoforming method also known as the negative forming method.

In the negative forming method a sheet is clamped over a cavity mold and heated until the desired temperature is reached, vacuum is applied from underneath as the sheet is drawn into the mold. Typically, where drawing into a deep mold a heated plug, roughly conforming to the mold shape is used to force the sheet down into the mold while vacuum is applied to complete the process. Sheets may be preheated with infrared radiant heaters or convection ovens. The temperature most desired for the sheet is that temperature which gives the maximum elongation at break. This temperature depends on the composition of the sheet and can be empirically derived through trial and error. In production thermoforming, acceptable rigid thermoplastic PVC compounds for this process must exhibit a range of performance characteristics including high elongation over a broad temperature range. Conventional PVC compounds used to form single-layer sheets are noted for limited draw-ratio. This is the ratio of original sheet thickness to the maximum thickness at a point which has been drawn to narrower thickness. Rigid PVC compounds typically break at a point where the draw ratio exceeds about 10. Unexpectedly, it was observed that the multilayer PVC articles could be successfully drawn to a ratio of greater than 15:1 and as high as 20:1. At a draw ratio of 20:1, a 140 mil sheet (0.35 cm) sheet was successfully drawn to 7 mils (0.018 cm).

In a laboratory method used to evaluate extruded sheets, the sheets were preheated and drawn into a cone-shaped mold. A qualitative rating was used to compare each sample. Higher scores indicate better thermoformability.

| Criteria | Rating |
|---|---|
| Large blow out at tip | 1 |
| good form to cone | 9 |
| Small blowout at tip | 5 |
| thin at tip | 10 |
| thick at tip | 8 |
| poor tip and cone shape | 6-7 |
| necking | 0 |

Rigid PVC compounds of the present invention exhibited a thermoforming rating of 8, more desirably, a thermoform rating of 9 and most desirably a thermoform rating 10.

From the Tables below it can be observed that, on the basis of thermoformability, Samples A7, A28, A58 and A76 are most desirable. Polyvinyl chloride having an I.V. of 0.54 (A7) and 0.68 (A28) can be utilized in compounds exhibiting good thermoformability. Noting from the Table above, those samples rating 9 or higher are numerous-A2, A3, A17, A18, A27, A29-33, A37-42, A44, A60, A66, A73, A79, A80, A94, A98 and A103, etc.. The compositions of the samples exhibiting desirable thermoforming ratings of 8 or above show that CPVC can also be compounded with or without plasticizer (A31 vs A32). Samples A38-A41 illustrate that a blend of two different PVC polymers each having a different I.V. of at least 0.2 I.V. units will exhibit desirable thermoforming characteristics. Samples A68 and A69 illustrate that PVC blended with crosslinked PVC will, in compounded form give good thermoforming performance. Blends of PVC, impact modifier and chlorinated polyethylene (A80) show good thermoforming. Blends of PVC and ASA (modifier M6) shown in A76 and A98 are desirable. Blends of PVC and ABS (low rubber) in A103, and with high rubber ABS (A7) are good thermoforming compounds.

Good thermoforming characteristics are necessary but not sufficient to define the preferred embodiments of the present invention because other desired properties outlined above should be exhibited.

TABLE 3A

| Thermoforming Ratings | |
|---|---|
| Sample | Rating |
| A1 | 8 |
| A2 | 9 |
| A3 | 9 |
| A4 | 8 |
| A5 | 8 |
| A6 | 8 |
| A7 | 10 |
| A8 | — |
| A9 | — |
| A10 | |
| A11 | 8 |
| A12 | — |
| A13 | |
| A14 | |
| A15 | — |
| A16 | — |
| A17 | 9 |
| A18 | 9 |
| A19 | |
| A20 | 8 |
| A21 | 9 |
| A22 | 9 |
| A23 | — |
| A24 | 8 |
| A25 | |
| A26 | 9 |
| A27 | 9.8 |
| A28 | 10 |
| A29 | 9.5 |
| A30 | 9.8 |
| A31 | 9.8 |
| A32 | 9 |
| A33 | 9 |
| A34 | 1 |
| A35 | 7.2 |
| A36 | 8 |
| A37 | 9 |
| A38 | 9.7 |
| A39 | 9.8 |
| A40 | 9.8 |
| A41 | 9.3 |
| A42 | 9.5 |
| A43 | 9 |
| A44 | 9.8 |
| A45 | 8.5 |
| A46 | 9 |

TABLE 3A-continued

Thermoforming Ratings

| Sample | Rating |
|--------|--------|
| A47 | 1 |

TABLE 3B

Thermoforming Ratings

| Sample | Rating |
|--------|--------|
| A48 | — |
| A49 | — |
| A50 | 8 |
| A51 | |
| A52 | 8 |
| A53 | — |
| A54 | 8 |
| A55 | 5 |
| A56 | 5 |
| A57 | 8 |
| A58 | 10 |
| A59 | 8 |
| A60 | 9 |
| A61 | |
| A62 | |
| A63 | |
| A64 | 5 |
| A65 | 8 |
| A66 | 9 |
| A67 | 8 |
| A68 | 8 |
| A69 | 8 |
| A70 | 8 |
| A71 | 8 |
| A72 | 8 |
| A73 | 9 |
| A74 | 8.5 |
| A75 | 5 |
| A76 | 10 |
| A77 | 8 |
| A78 | 3 |
| A79 | 9 |
| A80 | 9 |
| A81 | 8 |
| A82 | 5 |
| A83 | 8 |
| A84 | 8 |
| A85 | 5 |
| A86 | 8 |
| A87 | 8 |
| A88 | 5 |
| A89 | 8 |
| A90 | 8 |
| A91 | 1 |
| A92 | 2 |
| A93 | 8 |
| A94 | 9 |
| A95 | 7.5 |
| A96 | 5 |
| A97 | 10 |
| A98 | 9.5 |
| A99 | 8 |
| A100 | 8 |
| A101 | 5 |
| A102 | 8 |
| A103 | 9 |
| A104 | 8.5 |
| A105 | 8 |

Chemical Resistance

Compounds were mixed in a Henschel mixer, milled on a heated 2-roll mill and cut into 4"×8.5" (10×21.6 cm.) strips of 0.07–0.075 mills. The 4" strips were compression molded and died into ½ inch wide (1.3 cm.) strips.

Chemical resistance to HCFC compounds was evaluated by a "bent-bar" test. Samples of ⅛ inch nominal (0.31 cm.) thickness were used for chemical resistance testing. These strips were placed on a bend over a round object and retained in this strained position during exposure above HCFC liquid in a closed vessel. Exposure was maintained at ambient temperature for 7 days, after which the samples were observed and rated. The visual test focused on the appearance of crazing at the point of greatest stress where crazing was most likely to occur. Where large cracks were observed anywhere on the sample, a low rating was given.

| Criteria | Rating (PTS) |
|----------|--------------|
| 1. Perfect, no cracks, no distortion or curling. | 10 |
| 2. Small cracks on each side but not completely through. | 9 |
| 3. Cracks at ends of strips. | 7.5–8.5 |
| 4. Curling or distortion | subtract 1 pt. |
| 5. Exudation | |
| minor | subtract 0.5 |
| major (proportional to #) | subtract 1–2 |
| large blisters (proportional to size and #) | subtract 2–4 |

As noted from the Tables below, widely varying results were observed after exposure to HCFC. Higher ratings are preferred and can be seen in A6, A16, A18, A20, A21, A24, A26, A32, A35, A49, A50, A52, A53, A64, A68, A69, A71, A81, A85 and so forth. Polivinyl chloride polymers, blends of two polyvinyl chloride polymers and PVC, and chlorinated polyvinyl chloride polymers formulated as in the above listed compounds exhibited good bent bar ratings. Combinations of PVC and CPE; PVC and polyurethane (A24), PVC and nitrile rubber (A35), PVC absent DOP, PVC (I.V. 0.68) blended with PVC (I.V. 1.6) (A71); PVC (I.V. 0.68), crosslinked PVC (A68, A69); PVC in combination with high acrylonitrile ABS, ASA polymers, or acrylate-styrene-acrylonitrile polymer; PVC with MBS and/or acrylic impact modifier are preferred.

TABLE 4a

BENT BAR RATINGS

| Sample # | Rating 123 | 141b |
|----------|-----|------|
| A1 | 9 | 7 |
| A2 | 6 | 5 |
| A3 | 8 | 10 |
| A4 | 10 | 10 |
| A5 | 7 | 8.5 |
| A6 | 10 | 10 |
| A7 | 8.5 | 6 |
| A8 | 6 | 5 |
| A9 | 9 | 7 |
| A11 | 9 | 7 |
| — | — | — |
| — | — | — |
| A15 | 10 | 9 |
| A16 | 10 | 10 |
| A17 | 9.5 | 10 |
| A18 | 9 | 9 |
| A19 | 9.5 | 9 |
| A20 | 10 | 9 |
| A21 | 9.5 | 10 |
| A22 | 1 | 1 |
| A23 | 1 | 1 |
| A24 | 9 | 10 |
| A25 | 8 | 7 |
| A26 | 9.5 | 10 |
| A27 | 8.2 | 9.1 |
| A28 | 8.3 | 8.5 |
| A29 | 7 | 8.8 |
| A30 | 8 | 8.5 |
| A31 | 8 | 6 |

TABLE 4a-continued

BENT BAR RATINGS

| Sample # | Rating 123 | 141b |
|---|---|---|
| A32 | 8.7 | 8.7 |
| A33 | 7 | 6 |
| A34 | 5 | 8.3 |
| A35 | 9.1 | 9.3 |
| A36 | 7.8 | 8.9 |
| A37 | 8 | 8.7 |
| A38 | 8 | 9.8 |
| A39 | 7.5 | 8 |
| A40 | 5.5 | 7.5 |
| A41 | 8.9 | 9.5 |
| A42 | 8.3 | 8.9 |
| A43 | 8.4 | 9 |
| A44 | 8.5 | 8.5 |
| A45 | 9 | 8.7 |
| A46 | 9 | 8.3 |
| A47 | 8.7 | 8.8 |

TABLE 4b

BENT BAR RATINGS

| Sample # | Pass - Fail 123 | 141b |
|---|---|---|
| A48 | 8 | 9.6 |
| A49 | 9.1 | 9.2 |
| A50 | 9.2 | 9 |
| A51 | 9 | 8.5 |
| A52 | 10 | 10 |
| A53 | 9.6 | 9.6 |
| A54 | 9 | 9 |
| A55 | 8 | 6.5 |
| A56 | 8.3 | 6.8 |
| A57 | 8.5 | 9 |
| A58 | 8 | 6 |
| A59 | 7.5 | 6.5 |
| A60 | 8 | 6.5 |
| A61 | 7 | 7.5 |
| A62 | 8.3 | 7 |
| A63 | 8.5 | 8 |
| A64 | 9 | 9 |
| A65 | 8 | 8 |
| A66 | 8.8 | 9 |
| A67 | 7.5 | 7 |
| A68 | 9 | 9.2 |
| A69 | 9.1 | 9.1 |
| A70 | 5 | 9.2 |
| A71 | 9.6 | 9 |
| A72 | 8.3 | 9.2 |
| A73 | 6.5 | 8.7 |
| A74 | 6 | 8.8 |
| A75 | 5 | 8.7 |
| A76 | 8.5 | 8.8 |
| A77 | 7.5 | 7.3 |
| A78 | 9.5 | 8.5 |
| A79 | 6.5 | 7 |
| A80 | 9.6 | 8.3 |
| A81 | 9.5 | 9.4 |
| A82 | 9.3 | 8.6 |
| A83 | 8.5 | 7 |
| A84 | 9.5 | 8.5 |
| A85 | 9.4 | 9.1 |
| A86 | 9 | 9.3 |
| A87 | 8.5 | 8.3 |
| A88 | 8.0 | 9.2 |
| A89 | 9.2 | 8 |
| A90 | 8.5 | 9 |

General Appearance Rating Gels-Gloss

The samples evaluated above were also relatively rated in appearance. Sample clarity was given a relative rating and the incidence of gel particle imperfections and surface gloss were numerically rated from 1-10, higher numbers indicating better properties. Gloss was measured by a Gardner ® Gloss meter at 60°.

Table V illustrates a wide range of performance of the samples in terms of appearance qualities i.e., incidence of gel imperfections and surface gloss. By inspection of the illustrated performance, and the sample compositions, one can identify those compositions such as A3, A5, A8, A42 and A45, etc. which are good in terms of appearance properties such as gels and gloss.

TABLE V

| Sample | Gels | Gloss |
|---|---|---|
| A1 | — | — |
| A2 | — | — |
| A3 | 9 | 9 |
| A4 | — | — |
| A5 | 9.1 | 9.2 |
| A6 | — | — |
| A7 | 8.6 | 6 |
| A8 | 8.9 | 6.0 |
| A9 | 8.6 | 8.9 |
| A10 | 8.8 | 8.5 |
| A11 | 8.8 | 8.8 |
| A12 | 9 | 8 |
| A13 | 9 | 9 |
| A14 | 8 | 8 |
| A15 | 8.8 | 8.5 |
| A16 | 8.8 | 8.8 |
| A17 | 6 | 8 |
| A18 | 8 | 8 |
| A19 | 9 | 8.8 |
| A20 | 9 | 9 |
| A21 | 8.3 | 9 |
| A22 | 8.5 | 8.5 |
| A23 | 9.5 | 9.3 |
| A24 | 9 | 3.5 |
| A25 | 9 | 3 |
| A26 | 8.7 | 4 |
| A27 | 8.5 | 4.5 |
| A28 | 8.7 | 8.9 |
| A29 | 8.5 | 8.5 |
| A30 | 8.6 | 8.9 |
| A31 | 8.9 | 9 |
| A32 | 9.2 | 9.2 |
| A33 | 9 | 3 |
| A34 | 7 | 9 |
| A35 | 2 | 8 |
| A36 | 9.2 | 9 |
| A37 | 8.3 | 9 |
| A38 | 8.5 | 3 |
| A39 | 9.3 | 9.3 |
| A40 | 8.8 | 9.3 |
| A41 | 9.5 | 8.7 |
| A42 | 9 | 8 |
| A43 | 8.6 | 8 |
| A44 | 1 | 8 |
| A45 | 10 | 9 |
| A46 | 8.5 | |
| A47 | 8.6 | 8.9 |
| A48 | 9.3 | 8 |
| A49 | 8.5 | 9 |

B Series

Various polyvinyl chloride containing compounds as well as chlorinated polyvinyl chloride compounds were evaluated for use as the B-layer of the present invention. The B-layer composition, comprising PVC, blends of two PVC's, CPVC or a blend of PVC and CPVC will exhibit a higher heat distortion temperature than the composition comprising the A-layer. Sample B-layer compositions evaluated are listed below:

| Sample | Composition |
|---|---|
| B1 | 100 parts PVC 4/std. pkg. A/50 phr M15 |
| B2 | 70 parts PVC 2/std. pkg. B/30 phr M14 |
| B3 | 60 parts PVC 2/std. pkg. B/40 phr M14 |
| B4 | 50 parts PVC 2/std. pkg. B/50 phr M14 |
| B5 | 60 parts PVC 2/std. pkg. B/40 phr M15 |

-continued

| Sample | Composition |
|---|---|
| B6 | 50 parts PVC 2/std. pkg. B/50 phr M15 |
| B7 | 60 parts PVC 2/std. pkg. B/40 phr M22 |
| B8 | 50 parts PVC 2/std. pkg. B/50 phr M22 |
| B9 | 60 parts PVC 2/std. pkg. B/40 phr M20 |
| B10 | 50 parts PVC 2/std. pkg. B/50 phr M20 |
| B11 | 50 parts PVC 2/std. pkg. F/50 phr M20 |
| B12 | 30 parts PVC 2/std. pkg. F/70 phr M15 |
| B13 | 50 parts PVC 2/std. pkg. F/50 phr M14 |
| B14 | 30 parts PVC 2/2.5 phr M21/3 phr methyltin/ 2 phr M17/3.5 phr $TiO_2$/2 phr M18/0.8 phr stearic acid/10 phr M12/10 phr M24/70 phr M15/1 phr ester wax/0.5 phr oxidized polyethylene (PE) |
| B15 | 30 parts PVC 2/2.5 phr M21/3 phr methyltin/ 3 phr M17/5 phr $TiO_2$/2 phr M18/6 phr M12/ 1 phr stearic acid/5 phr M24/70 phr M15/ 0.5 phr oxidized PE/1.5 phr ester wax |
| B16 | 30 parts PVC 2/2.5 phr M21/3 phr methyltin/ 3 phr M17/5 phr $TiO_2$/1.5 phr M18/6 phr M12/ 1 phr stearic acid/1 phr mineral oil/1 phr stearic acid/ 5 phr M24/70 phr M15/1 phr oxidized PE/1.5 phr ester wax |
| B17 | 40 parts PVC 2/2.5 phr M21/3 phr methyltin/2 phr M17 5 phr $TiO_2$/1.5 phr M18/6 phr M12/L4/5 phr M24/ 35 phr M15/25 M20/1 phr oxidized PE/1.5 phr ester wax |

\*Sold by BFGoodrich Co., Cleveland, Ohio
\*\*Estane ® 58206 polyester urethane sold by BFGoodrich Co.CO- From the Table below it is noted that the (B) layer compounds exhibit a wide variation in performance under the tests conducted. Sample B1 illustrates the preferred combination of chemical resistance, thermoforming and barrier properties. Where (B) layers come in contact with HCFC 141b, Samples B2, B3, B4 and B8 will give good performance and are preferred (B) layer components in the multilayer articles. Where contact of the B layer is with HCFC 123, the sample B2, B3, B9, and B10 exhibit good resistance to this HCFC.

It has been observed that a PVC compound formulated with from up to 70% by weight of the B layer of acrylic imide or alpha methyl styrene-styrene-acrylonitrile polymers exhibit improved HDT, and thermoforming in a multilayer compositions of the present invention. Formulations suggested above in terms of impact modification, polymer modifiers, stabilizers, and lubrication in combination with PVC and the specified heat distortion improving agents are useful for shaped articles, in particular, thermoformed articles in applications such as inner liners of insulated refrigerator housings and door panels.

| SAMPLE | BENT BAR 123 | BENT BAR 141B | THERMOFORM | BARRIER 123 | BARRIER 141b |
|---|---|---|---|---|---|
| B1 | 7.5 | 10 | 8 | 8 | 10 |
| B2 | 9 | 9.1 | 9.5 | 3 | 7 |
| B3 | 8.7 | 9 | 9 | 1 | 6 |
| B4 | 7.8 | 8.7 | — | 1 | 3 |
| B5 | 7 | 8.5 | 6 | 1 | 6 |
| B6 | 6 | 7 | 8 | 1 | 5 |
| B7 | 8.5 | 8 | 8.5 | 1 | 7 |
| B8 | 2 | 8.7 | 10 | 1 | 5 |
| B9 | 8.7 | 8 | 9 | 1 | 8 |
| B10 | 8.7 | 8 | 9 | 1 | 8 |
| B11 | — | — | 9 | — | — |
| B12 | — | — | 8.5 | — | — |
| B13 | — | — | — | — | — |
| B14 | — | — | 8.5 | — | — |
| B15 | — | — | 7 | — | — |
| B16 | — | — | 6 | — | — |
| B17 | — | — | 7 | — | — |

EXTRUSION OF MULTILAYER SHEETS

Samples of PVC compounds were formulated for co-extrusion of multilayer sheets useful for thermoforming into articles having contact with HCFC's. Two compounds were formulated in such a manner to exhibit melt viscosity as measured by the widely recognized Brabender Plasticorder equipped with a torque measuring device. Each compound, one representing layer (A) and the other (B) were evaluated separately and the torque characteristics noted. Sixty-five grams of polyvinyl chloride compound cubed samples evaluated for Brabender torque were placed into the Brabender bowl heated to 400° F. (204° C.). The cubes were allowed to preheat in the bowl for 3 minutes before starting the mixing. The torque at which fusion began when the mass underwent melt transition was noted as "fusion torque". Beyond that point, the melt viscosity decreased characteristically to what is referred to as "Min. Torque". This torque at the minimum is characteristic of equilibrium torque exhibited during continuous melt processing as in production extrusion processes. The sample temperature is monitored with a thermal probe attached on the Brabender bowl and which protrudes into the sample as it passes. Torque is measured in meter-grams. Brabender torque measurements are considered accurate to ±100 meter grams. A more precise measurement can be obtained by the use of a capillary rheometer, but for the purpose of demonstrating the invention herein, Brabender torque measurements were obtained.

Torque matching two or more compounds for optimum multilayer coextrusion can be achieved by a process of trial and error in the use of the various polymeric modifiers such as processing aids, lubricants, plasticizers, and by selecting molecular weights of various components in order to match the minimum torque exhibited. Much art is involved and the practitioner may use various approaches in arriving at desired torque-matched compounds. By trial and error two examples of two-layer compounds were made and given below.

| ITEM | Wt. PARTS | ITEM | Wt. PARTS |
|---|---|---|---|
| (A) Layer No. 1 | | (B) Layer No. 1 | |
| PVC 2 | 100 | PVC 2 | 50 |
| M21 | 2 | M20 | 50 |
| Stabilizer | 2 | M21 | 2 |
| M17 | 3 | Stabilizer | 3 |
| $TiO_2$ | 4.5 | M17 | 1 |
| M18 | 1 | $TiO_2$ | 3.5 |
| M12 | 2 | M18 | 1 |
| Acrylic Impact Modifier | 6 | M12 | 6 |
| MBS Impact Modifier | 8 | Acrylic Impact Modifier | 5 |
| | | Oxidized PE | 0.4 |
| L6 | 3.8 | L5 | 2.2 |
| A) Layer No. 2 | | (B) Layer No. 2 | |
| PVC 2 | 100 | PVC 2 | 50 |
| M21 | 2 | M20 | 50 |
| Stabilizer | 3 | Stabilizer | 3 |
| $TiO_2$ | 3.5 | M17 | 0.5 |
| Acrylic Impact Modifier | 6.0 | M21 | 2 |
| | | $TiO_2$ | 3.5 |
| L6 | 3.8 | M18 | 1.0 |
| M12 | 2 | M12 | 6 |
| M25 | 6 | L5 | 2.5 |
| M18 | 1 | M24 | 5 |
| MBS Impact Modifier | 6 | Modifier | 8 |
| Colorants | 0.024 | Colorants | 0.024 |

Each of the above compounds were prepared for co-extrusion by first combining the particulate ingredients on a Henschel ® mixer, followed by melt mixing on a Banbury ® mixer and treated roll mill. Coextrusion was carried out on a Brabender ® extruder having a screw of length/diameter (L/D) of 20:1 and equipped with a 4 inch (10 cm) sheet die/ The following conditions were noted. length/diameter (L/D) of 32:1 and equipped with a 44 inch (112 cm.) sheet die to produce a 3-layer sheet as an A-B-A configuration. The following conditions were noted.

|  | Temperature °F./°C. | | | |
| --- | --- | --- | --- | --- |
|  | A1 | A2 | B1 | B2 |
| Henschel ® drop temp. | 250/121 | 250/121 | 250/121 | 250/121 |
| Banbury ® drop temp. | 356/180 | 356/180 | 358/181 | 358/181 |
| Banbury stock temp. | 388/197 | 388/197 | 354/195 | 384/195 |
| Brabender torque min. meter-grams | 1300 | 1100 | — | — |

Preferably the difference in Brabender torque between the layers will not exceed 400 meter-grams. Most preferredly, the Brabender torque values of each layer will not vary by more than about 200 meter-grams.

The 3-layer composite sheets were evaluated for heat distortion temperature (HDT) under a 264 psi load per ASTM D-648. Below are heat distortion temperatures of A, B layer sheets and the multilayer sheet. The preferred multi-layer articles derived from the above described compositions thus will have one layer which exhibits a heat distortion temperature (HDT), measured as a single layer, of at least 3° C. (5° F.) higher than the HDT of the other layer.

|  | HDT °F./°C. |
| --- | --- |
| A Layer | Approx. 158°/68° |
| B Layer | Approx. 181°/83° |
| Multilayer | Approx. 174°/79° |

I claim:

1. A rigid multilayer thermoplastic polyvinyl chloride product exhibiting resistance to hydrochloroflurochemicals, comprising: a layer (A) comprising polyvinyl chloride, at least one stabilizer for polyvinyl chloride, and at least one lubricant; and another layer (B) in intimate contact with said layer (A) and comprising polyvinyl chloride, at least one stabilizer for polyvinyl chloride, at least one lubricant, and a heat distortion improving agent, wherein at least one layer contains an impact modifier and wherein the heat distortion temperature according to ASTM D-648 at 264 psi, of the multilayer product is at least 3° C. (5° F.) higher than the heat distortion temperature of said layer (A) measured as a single layer.

2. A multilayer product of claim 1 wherein said at least one impact modifier is selected from the group consisting of polybutadiene jointly graft-copolymerized with styrene and methyl methacrylate, polybutadiene jointly graft-copolymerized with acrylonitrile and styrene, polybutadiene jointly graft-copolymerized with acrylonitrile and alpha-methyl styrene, nitrile rubber blended with a stryene-acrylonitrile polymer, ethylene-propylene-diene rubber graft-copolymerized with vinyl chloride, ethylene-propylene-diene rubber jointly graft-copolymerized with styrene and acrylonitrile, polybutadiene graft-copolymerized with styrene, methyl methacrylate and acrylonitrile, acrylic impact modifier, poly butylacrylate graft-copolymerized with methyl methacrylate, poly butylacrylate graft-copolymerized with methyl methacrylate copolymer, polyacrylate jointly graft-copolymerized with methyl methacrylate and styrene, poly butylacrylate graft polymerized with acrylonitrile and styrene butyl rubber graft-copolymerized with vinyl chloride, block copolymer of styrene-butadiene-styrene, radial block copolymer of styrene and butadiene, styrene-butadiene rubber, vulcanizable acrylate rubber, and chlorinated polyethylene.

3. A multilayer product of claim 1 wherein said polyvinyl chloride has an inherent viscosity according to ASTM D-1243 of from about 0.4 and 2.0.

4. A multilayer product of claim 3 wherein said inherent viscosity is from about 0.4 to about 1.6.

5. A multilayer product of claim 1 wherein said heat distortion improving agent is selected from the group consisting of styrene-acrylonitrile copolymer, alpha methyl styrene-styrene-acrylonitrile terpolymer, a polymer of alpha methyl styrene-styrene-N-cyclohexyl maleimide, a polymer of alpha methyl styrene-styrene-N-phenylmaleimide, imidized polymethyl methacrylate, postchlorinated polyvinyl chloride, styrene-maleic anhydride polymer, imidized styrene-maleic anhydride polymer, acrylic-imide copolymer, acrylonitrile-acrylate copolymer, acrylonitrile-acrylate-polybutadiene graft copolymer, and alpha methyl styrene-methylmethacrylate-and acrylonitrile terpolymer.

6. A multilayer product of claim 1 wherein said (A) and said (B) layer each exhibit similar melt viscosities as measured by a Brabender torque rheometer and which said viscosities do not differ by more than about 400 meter-grams under the same measurement conditions.

7. A multilayer product of claim 6 wherein said melt viscosities do not differ by more than 200 meter grams.

8. A multilayer product of claim 1 wherein said (A) layer further comprises from about 1 to about 15 parts by weight of a plasticizer per 100 parts by weight of said polyvinyl chloride.

9. A multilayer product of claim 8 wherein said plasticizer has a molecular weight greater than 390.

10. A multilayer product of claim 9 wherein said plasticizer is selected from the group consisting of: phthalate esters, derivatives of azelaic acid, derivatives of benzoic acid, derivatives of citric acid, derivatives of isophthalic acid, derivatives of sebacic acid, derivatives of isosebacic acid, derivatives of stearic acid, derivatives of tartaric acid, derivatives of oleic acid, derivatives of succinic acid, derivatives of phosphoric acid, derivatives of trimellitic acid, partial esters of dicarboxylic acids, glycolates, glycerol derivatives, polyester, polyether, ethylene vinyl acetate polymer, and ethylene-methylacrylate polymer.

11. A multilayer product of claim 1 wherein said layer (A) further comprises post-chlorinated polyvinyl chloride.

12. A multilayer product of claim 1 wherein said layer (B) further comprises post-chlorinated polyvinyl chloride.

13. A multilayer product of claim 1 wherein said polyvinyl chloride polymer is post chlorinated.

14. A multilayer product of claim 1 wherein said layer (A) further comprises another polyvinyl chloride polymer having an inherent viscosity at least 0.2 units higher than said polyvinyl chloride polymer.

15. A multilayer product of claim 14 wherein said another polyvinyl chloride polymer has an inherent viscosity of at least 0.35 units higher than said polyvinyl chloride polymer.

16. A multilayer product of claim 1 wherein said impact modifier is present at from about 5 to 20 weight parts per hundred weight parts of said polyvinyl chloride polymer in (A).

17. A multilayer product of claim 1 wherein layer (A) comprises at least one said lubricant selected from the group consisting of: a hydrocarbon wax, derivatives of stearic acid, oxidized polyolefin, bis-stearamide derivatives, epoxide derivatives, glycerol monostearate, ethylene glycol di-stearate, oxidized polyethylene, and wax selected from the groups consisting of fatty esters, and polyol esters.

18. A multilayer product composition of claim 1 wherein said layer (A) further comprises a polymeric modifier selected from the group consisting of acrylonitrile-styrene-acrylate polymer, a methylmethacrylate-styrene-acrylonitrile polymer, a polyacrylate polymer, a polyacrylate copolymer, ethylene-vinyl acetate polymer, ethylene-vinyl acetate-carbon monoxide terpolymer, styrene-acrylonitrile polymer and acrylonitrile-butadiene polymer.

19. A multilayer product of claim 1 wherein said layer (A) comprises polyvinyl chloride, a stabilizer, methacrylate-butadiene-styrene impact modifier, acrylic impact modifier, opacifying pigment, at least one derivative of stearic acid, at least one hydrocarbon, an epoxide derivative, and an ester wax; and wherein said layer (B) comprises polyvinyl chloride, a stabilizer, a heat distortion improving agent selected from the group consisting of styrene-acrylonitrile copolymer, alpha methyl styrene-styrene-acrylonitrile terpolymer, a polymer of alpha methylstyrene-styrene-N-cyclohexyl maleimide, a polymer of alpha methyl styrene-styrene-N-phenylmaleimide, imidized polymethyl methacrylate, post chlorinated polyvinyl chloride, styrene-maleic anhydride polymer and an acrylic-imide copolymer.

20. A multilayer product of claim 1 in the form of a co-extruded sheet.

21. A multilayer product of claim 1 in the form of a thermoformed article derived from said sheet.

22. A rigid, multilayer thermoplastic polyvinyl chloride product exhibiting resistance to hydrochlorofluorochemicals, comprising:
a layer (A) comprising polyvinyl chloride, a stabilizer for polyvinyl chloride, at least one impact modifier, a lubricant; and
another layer (B) in intimate contact with said (A) layer and comprising polyvinyl chloride, a stabilizer for polyvinyl chloride, a lubricant, and a heat distortion improving agent, wherein the heat distortion temperature of layer B alone is at least 3° C. (5° F.) higher than the heat distortion temperature of said layer (A) as measured according to ASTM-D 648 at 264 p.s.i., and
(c) a third layer in intimate contact with layer (B) and comprising: polyvinyl chloride, a stabilizer, at least one impact modifier, and at least one lubricant.

* * * * *